July 26, 1949.  W. F. ALLER  2,477,399
SIZE GAUGING DEVICE
Filed Dec. 22, 1945
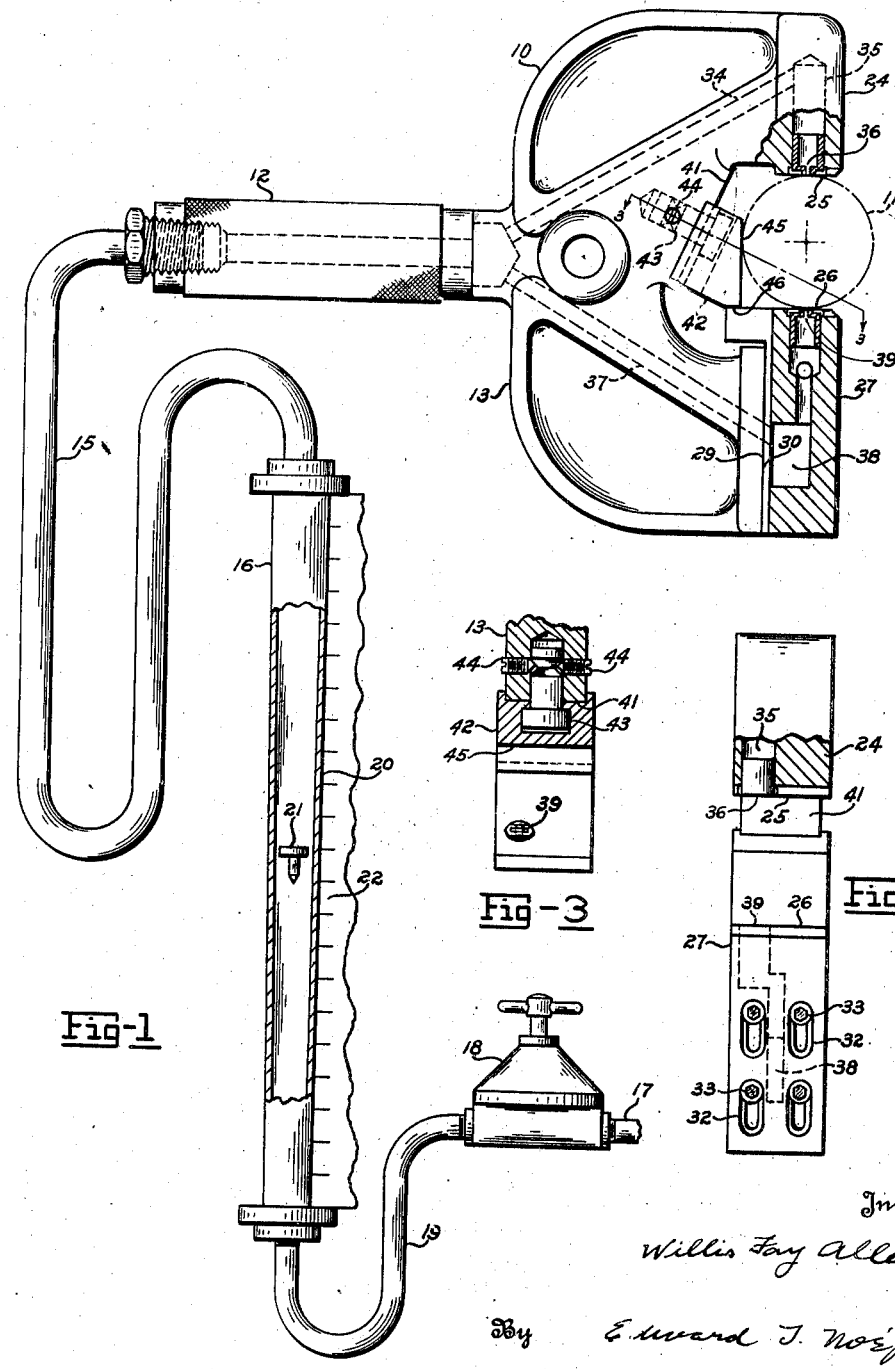
Inventor
Willis Fay Aller
By Edward T. Noe
Attorney Patented July 26, 1949

2,477,399

UNITED STATES PATENT OFFICE 2,477,399

SIZE GAUGING DEVICE

Willis Fay Aller, Dayton, Ohio, assignor to The Sheffield Corporation, Dayton, Ohio, a corporation of Ohio Application December 22, 1945, Serial No. 636,632

2 Claims. (Cl. 73—37.5)

This invention relates to gauges for measuring the size of a workpiece or comparing it with a part of standard size.

One object of the invention is the provision of a gauging member adapted for use in conjunction with means for measuring fluid flow, and having a fixed anvil and a relatively adjustable anvil between which the workpiece is located with at least one of these anvils provided with a gauging nozzle, the construction providing for convenient adjustment for the space between the anvils to accommodate workpieces of different diameters while coordinating the workpiece centers with the nozzle position.

Another object is the provision of a gauging member having a plurality of opposed work engaging anvils provided with parallel work engaging surfaces at least one of which has a gauging nozzle, with an adjustably positioned back stop and the adjustable anvil having cooperating portions by means of which one can be accurately located from the other.

Another object is the provision of a gauging member having two opposed work engaging anvils which are relatively adjustable for varying the distance between the anvils, and a cooperating adjustable backstop which can be instantly positioned in the proper position to properly coordinate the work center with the anvils.

Other objects and advantages of the invention will be apparent from the following description, the appended claims, and the accompanying drawing, in which, Fig. 1 is an elevation showing a work engaging member embodying the present invention, and its connection to a flow measuring device;

Fig. 2 is an end view of the work engaging member; and

Fig. 3 is a section on the line 3—3 of Fig. 1.

Referring more particularly to the drawing in which a preferred form of the invention is illustrated, 10 designates a gauging member adapted for application to a workpiece indicated at 11. The gauging member is shown with a handle 12 projecting from a body portion 13 and serving as a connection to a flexible tube 15 which extends to a flow measuring device 16. Any suitable flow measuring device may be used in conjunction with the gauging member 10, but as herein shown, the device 16 measures changes in rate of air flow supplied from it at a controlled pressure and then through the flexible tube 15 and discharging through a leakage path or paths controlled by the workpiece surface. Such an instrument, as more fully described in U. S. Letters Patent No. 2,254,259, may include an air supply pipe 17, a pressure regulating valve 18, and a connection 19 to a transparent tapered tube 20 the internal cross-sectional area of which increases gradually from the bottom to the top. Within this tube is a light float 21 the height of which depends upon the rate of flow of fluid through the tube. The level of the float can be indicated on a scale plate 22.

The member 10 has a work engaging anvil 24, preferably integrally made with the body portion and projecting out over a work position. It has a flat work engaging surface 25 adapted for contact with the periphery of a workpiece to be gauged and spaced opposite the work engaging surface 26 of the anvil 27.

The anvil 27 is adjustably supported on the body portion 13 so that the distance between the flat work engaging surfaces 26 and 25 can be readily changed. As shown, the anvil 27 has a slide surface 29 extending at right angles to the surface 26 and fitting against the guide surface 30 on the body portion 13. Slots 32 are provided in the anvil, and bolts 33 extending through these slots and threaded in tapped holes in the body portion serve to hold the anvil securely in place. When these bolts are loosened, the slots permit the anvil to be raised or lowered with respect to the anvil 24.

The body member 13 has a fluid passage 34 extending from the hollow handle to a small chamber 35. At the end of this chamber and in the anvil 24 is a gauging orifice 36 arranged exactly over the center of the work-piece 11. As viewed in Fig. 2, the axis of the nozzle is much closer to one side of the anvil than the other so that a measurement can be taken close to a shoulder on the workpiece. The body portion 13 also has a passage 37 extending from the handle and leading outwardly into a small chamber 38 in the anvil 27. This passage 37 is in communication with the chamber 38 regardless of the position of adjustment of the anvil member, and a tight fit of the surfaces 29 and 30 prevent loss of fluid pressure excepting through the gauging orifice 39 arranged directly below the gauging orifice 36. The faces of the gauging nozzles that cooperate with the surfaces of the workpiece provide leakage paths the size of which are governed by the size of the workpiece. The amount of fluid flow through both of these nozzles is indicated by the flow measuring device 16.

In determining the position of the lower adjustable anvil 27, the distance between the surfaces 25 and 26 is set by spacer or Johansson blocks so that it is slightly in excess of the maximum range of diameters to be gauged. The workpieces can thus be readily applied between the opposed work engaging portion of the gauge and rest on one of the anvils with a slight space between the other anvil and the workpiece. Fluid supplied to the gauging member will flow through both gauging nozzles since the surfaces of the nozzles are slightly recessed below the work engaging surface 25 or 26.

The body portion 13 has a finished guide surface 41 forming a mount for a backstop 42. A flanged stud 43 extends out through a socket in the body 13 and its head operates in a groove in the backstop. Set screw 44 has a wedge end that engages a groove in the stud 43 to hold the backstop securely in any position of adjustment. The backstop surface that contacts with the workpiece is shown at 45, this surface extending perpendicularly to the work engaging surface 26.

To correlate the position of the backstop with the space between the two anvils, the surface 41 is inclined with respect to the surface 25 at an angle of 63 degrees so it is about 27 degrees from the backstop surface 45. An abutment surface 46 on the backstop contacts the upper surface 26 of the adjustable anvil. If the screw 44 is loosened the backstop may be manually raised or lowered on the surface 41 according to the adjustment movement given to the anvil 27 on the body member. With this angular relationship of the surfaces the amount of adjustment of the backstop is just half of the amount of adjustment of the anvil. Thus as the anvil 27 is moved to accommodate a workpiece of a particular size, it automatically positions the backstop so that the work center will be held directly in line with the two gauging nozzles for gauging the maximum diameter of the workpiece. The screw 44 is of course tightened after the anvil 27 is positioned and tightened. It is therefore unnecessary to determine by accurate measurement or by trial and error just where the backstop should be when the position of the anvil 27 is changed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging member adapted for connection to a fluid pressure source and a flow measuring device, said member comprising a body having a work engaging anvil, a second anvil adjustably mounted on said body for movement towards and from the first anvil and provided with a work engaging surface arranged substantially parallel to the work engaging surface of the first anvil, at least one of said anvils having a fluid nozzle adapted for cooperation with a workpiece to provide a fluid leakage path, means for locking the adjustable anvil in position, and a backstop slidably mounted on said body for movement at an angle of about 27 degrees to the direction of movement of the adjustable anvil and having a portion located by the adjustable anvil to maintain the position of the nozzle with respect to the maximum diameters of workpieces of different sizes.

2. A gauging member adapted for connection to a fluid pressure source and a flow measuring device, said member comprising a body having a work engaging anvil, a second anvil slidably mounted on said body for movement towards and from the first anvil and provided with a work engaging surface arranged substantially parallel to the work engaging surface of the first anvil, said anvils each having a fluid nozzle adapted for cooperation with a workpiece at the point of maximum diameter to provide a fluid leakage path, means for locking the adjustable anvil in position, and a backstop slidably mounted on said body for movement at an angle to the direction of movement of the adjustable anvil and having a flat work locating surface perpendicular to the work engaging surfaces of the anvils, said backstop having a portion resting on the adjustable anvil to maintain the relative position of the backstop with respect to the nozzles.

WILLIS FAY ALLER.

REFERENCES CITED

The following references are of record in the file of this patent:

UNITED STATES PATENTS

| Number | Name | Date |
|---|---|---|
| 1,184,392 | Smith | May 23, 1916 |
| 2,019,066 | Balsiger | Oct. 29, 1935 |
| 2,032,856 | Steiner | Mar. 3, 1936 |
| 2,357,569 | Wright et al. | Sept. 5, 1944 |
| 2,404,750 | Schmidt | July 23, 1946 |